United States Patent Office 3,149,137

Patented Sept. 15, 1964

3,149,137

PROCESS FOR THE PRODUCTION OF ORGANIC PHOSPHORUS HALIDE-ALUMINUM HALIDE COMPLEXES AND PHOSPHONIC ACID DIESTERS AND DIAMIDES THEREFROM

Clarence W. Huffman, Glenview, and Martin Hamer, Chicago, Ill., assignors to International Minerals & Chemical Corporation, a corporation of New York No Drawing. Filed Sept. 13, 1962, Ser. No. 223,514
28 Claims. (Cl. 260—448)

This invention relates to an improved method for the preparation of aluminum halide complexes of monoalkyl pentavalent phosphorus halides. In one of its aspects this invention relates to an improved method for preparing an aluminum chloride complex of a monoalkyl phosphonyl dichloride. In another of its aspects this invention relates to an improved method for preparing an aluminum chloride complex of a monoalkyl phosphorus, tetrachloride. In still another of its aspects this invention relates to a method for the preparation of ester and amide derivatives of monoalkyl phosphonic acids.

In the past few years there has been a tremendous amount of work done in the field of organic phosphorus compounds, particularly in the field of esters and amides of the various acids of phosphorus. These compounds have shown themselves to be quite versatile in their end uses. For example, they can be employed in insecticidal, fungicidal and germicidal formulations, as plasticisers, as gasoline lubricating and fuel oil additives, and for many other uses. Although the knowledge of their utility has expanded, the commercialization of other than phosphate esters has not been extensive. This is due in large part to the economics involved. Many difficulties attend the known methods of phosphonate production.

In the preparation of organic phosphorus compounds it is a common procedure to use as a starting material a phosphorus trihalide and to introduce an organic radical by replacement of the halogen atoms attached to the phosphorus through carbon, oxygen, sulphur or nitrogen linkages. Clay, for example, disclosed the reaction of $PCl_3$ with RCl in the presence of aluminum chloride to form the complex $(RPCl_3)^+ (AlCl_4)^-$ which was allowed to react with water to form the phosphonyl dichloride, $RPOCl_2$, J. Org. Chem., 16, 892 (1951). When the R happens to be a long chain hydrocarbon radical the compound RCl becomes expensive and not easy to prepare. Okhlobystin and Zakharkin (Izvest. Akad. Nauk SSSR, 1006–8 (1958)) have reported the reaction of $PCl_3$ with a trialkylaluminum to form a mixture containing phosphines of varying degrees of organic substitution. U.S. Patent No. 3,036,132 to Becker makes a similar disclosure, although Becker was primarily concerned with reactions between organic alkali metal aluminum compounds and phosphorus trihalides.

Another factor has been the yields obtained in the preparation of organic phosphorus compounds. As pointed out, very often the intermediate reaction products must be isolated and purified before they can be used further. This, of course, involves tedious separation and purification problems which incur material losses and which deter commercial adoption unless the final product commands a price adequate to insure a reasonable profit.

In accordance with the present invention we have discovered a method for the preparation of organic phosphorus compounds which involves the use of readily available raw materials to produce an aluminum halide complex of monoalkyl pentavalent phosphorus halides which can be easily converted to desirable organic phosphorus compounds. In our process, we react a trialkyl aluminum with a pentavalent phosphorus halide which may be either the pentahalide or oxytrihalide substantially according to the following equations:

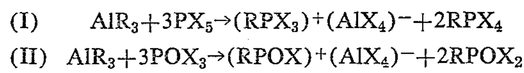

$$\text{(I)} \quad AlR_3+3PX_5 \rightarrow (RPX_3)^+(AlX_4)^- + 2RPX_4$$

$$\text{(II)} \quad AlR_3+3POX_3 \rightarrow (RPOX)^+(AlX_4)^- + 2RPOX_2$$

In the above equations R is an alkyl radical having from 2 to 24 carbon atoms and X is a halide selected from the group consisting of chlorine, bromine and iodine. The reaction is conducted in the absence of molecular oxygen and in the presence of an inert, anhydrous solvent medium. We have also found that the aluminum halide complex or free halide need not be isolated before conversion to desirable organic compounds. That is, we have found that the complexed form in admixture with the free compound can be converted to esters and amides as a mixture and the desirable organic compound recovered at the end of the process after splitting off of the aluminum halide from the complex. Further, the complex, as well as the free compound formed, is already in the pentavalent state and eliminates the need for troublesome oxidation procedures required when the trihalide is employed in the alkylation reaction.

It is therefore, an object of the present invention to provide an improved method for the preparation of aluminum halide complexes of monoalkyl pentavalent phosphorus halides.

It is another object of this invention to provide an improved method for preparing an aluminum chloride complex of a monoalkyl phosphonyl dichloride.

It is a further object of this invention to provide an improved method for preparing an aluminum chloride complex of a monoalkyl phosphorus tetrachloride.

It is still another object of this invention to provide a method for the preparation of monoalkyl phosphonate esters.

It is a further object of this invention to provide a method for the preparation of monalkyl phosphonamides.

Additional objects of the present invention will be apparent from the following description.

In its broadest aspects this invention is concerned with the preparation of monoalkyl pentavalent phosphorus halide-aluminum halide complexes by the reaction of a trialkyl aluminum with a pentavalent phosphorus halide according to either of the equations:

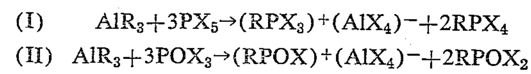

$$\text{(I)} \quad AlR_3+3PX_5 \rightarrow (RPX_3)^+(AlX_4)^- + 2RPX_4$$

$$\text{(II)} \quad AlR_3+3POX_3 \rightarrow (RPOX)^+(AlX_4)^- + 2RPOX_2$$

In the above formulae X is a halide selected from the group consisting of chlorine, bromine and iodine. The preferred halide is chlorine because of its ready availability and low cost. R is an alkyl hydrocarbon radical having from 2 to 24 carbon atoms. Examples of the alkyl radicals include ethyl, propyl, butyl, pentyl, hexyl, heptyl, octyl, nonyl, decyl, undecyl, dodecyl, tridecyl, tetradecyl, hexadecyl, octadecyl and eicosyl. All of the R's may be alike, as for example in triethylaluminum and trioctylaluminum, or they may be mixed alkyl radicals, for example, octyl decyl tetradecyl aluminum and the like. Preferred trialkylaluminums include triethylaluminum, trioctylaluminum and mixed-alkyl trialkylaluminum.

Since the reactants and the products react readily with oxygen and water in the atmosphere, it is necessary to effect reaction with the exclusion of these and other reactive materials. The reaction may be effected under an atmosphere of nitrogen, helium, argon, or other inert gas. The reactions are exothermic and can be effected over a broad temperature range, generally between about −50° C. up to about 100° C. and higher if means are taken to remove the volatile materials. It is generally desirable, although not absolutely essential, to employ inert solvents or diluents in the reaction zone where they function to dissolve reacting materials and products and to absorb some of the heat released during the reaction. Especially useful solvents or diluents include unreactive hydrocarbons such as the saturated hydrocarbons and the aromatic hydrocarbons. Suitable saturated hydrocarbon solvents or diluents include the alkanes such as pentanes, hexanes, or higher boiling alkanes such as n-heptane, octane, dodecane, mineral oil, or the like; cycloalkanes such as cyclopentane, cyclohexane, and alkylcycloalkanes; aromatic hydrocarbons such as benzene and alkylbenzenes, naphthalene; chlorinated alkanes such as ethylene dichloride, methylene dichloride, and the like. The specific solvents are chosen with regard to the particular reaction conditions which are selected so that the solvent or diluent will be employed in the liquid or liquid-vapor mixture in the reaction zone.

The reaction may be effected at atmospheric pressure or superatmospheric pressures. Ordinarily the reactions in question do not proceed with substantial pressure change, so that the selection of the desired pressure is based principally upon physical considerations involved in the reaction, as for example, the boiling point of the reaction solvent or diluent.

Because the desired organic phosphorous compound is a monoalkyl derivative the ratio of pentavalent phosphorus halide to aluminum trialkyl is at least 3 to 1. Under these conditions there is generally little, if any secondary or tertiary alkyl substitution of the phosphorus atom. While a slight excess is desirable, a large excess of phosphorus halide should be avoided in order to minimize contamination on further reaction in the preparation of a desired derivative.

While it is possible to separate the aluminum halide-monoalkyl pentavalent phosphorus halide complex from the resulting reaction mixture, as for example, by distilling off the solvent and free monoalkyl pentavalent phosphorus halide therefrom, we have found that this step is unnecessary and that the reaction mixture including the complex and the free halide can be converted advantageously to desirable monoalkyl phosphonic acid derivatives. Thus, in our process, the breaking of the aluminum halide complex is postponed until the end of the process when the desired derivative is formed and is to be recovered. It will be seen immediately that this expedient eliminates tedious and costly intermediate separation steps and permits carrying out the entire process from beginning to end with a minimum of material transfers.

In a specific embodiment of the present invention one mole proportion of triethyaluminum dissolved in dry benzene is added under a nitrogen blanket to a solution containing at least three mole proportions of $PCl_5$ dissolved in dry benzene over a period of about 30 minutes to about an hour at a temperature between about 20 and 50° C. After addition of the aluminumtriethyl, stirring at the same temperature is continued for a period of from about 30 minutes to about 3 hours. In another embodiment, $POCl_3$ is substituted for the $PCl_5$ used in the previous embodiment.

The chemistry of converting the mixture of complex and free pentavalent monoalkyl phosphorus halide to desirable derivatives is reasonably straightforward and varies between the oxychloride and the polychloride only to the extent that the former contains oxygen. Use of $POCl_3$ provides a distinct advantage in that it eliminates one or more intermediate steps in the preparation of phosphonate esters and amides.

With reference to the reaction mixture produced by the reaction between $PCl_5$ and aluminum alkyl (Equation I), as described hereinabove, the compounds therein can be converted to the corresponding complex and free monoalkylphosphonyl dichloride by treatment with a compound capable of acting as a chalcogen donor such as oxygen or sulphur. Examples of classes of such compounds include organic hydroxy or mercaptan derivatives such as lower aliphatic alcohols or mercaptans or aromatic compounds such as cresols, etc. Specific illustrative examples of chalcogen donors include methanol, ethanol, propanol, isopropyl alcohol, butanol, t-butyl alcohol, phenol, cresols, xylenols, etc., methyl mercaptan, ethyl mercaptan, propyl mercaptan, sulphur, hydrogen sulfide and the like. The foregoing materials are preferably employed in the absence of moisture. If the monoalkyl phosphonyl dichloride is the desired product, chalcogen donation can be accomplished by hydrolysis with water or aqueous acids such as HCl, $H_2SO_4$, acetic acid, etc. in which case the aluminum halide complex of the desired monoalkyl phosphonyl dichloride will be broken. If, however, the monoalkyl phosphonyl dichloride is only an intermediate product which is to be converted to an ester or an amide, it is preferable to carry out the conversion to the complex and free monoalkyl phosphonyl dichloride in an anhydrous system.

It will be appreciated that the expression "monoalkyl phosphonyl dichloride" is intended to include both the oxygen and sulphur analogs.

Assuming that the complex and free monoalkyl phosphonyl dichlorides have been prepared in an anhydrous medium, monoalkyl phosphonate esters can be prepared therefrom by treating the reaction mixture as obtained with about 6 mole proportions of an organic monohydroxy compound having the formula R'OH wherein R' is an organic radical selected from the group consisting of aliphatic hydrocarbon, cycloaliphatic hydrocarbon, aromatic hydrocarbon, mixed aliphatic-aromatic hydrocarbon and alkyl oxyalkene. The hydrocarbon radicals may be saturated or unsaturated and substituted or unsubstituted, but when substituted they must be substituted with inert fnctional groups; that is, groups which will not interfere with the reaction between the hydroxyl group and the chlorine from the monoalkyl phosphonyl dichloride. Illustrative examples of R' groups include methyl, ethyl, propyl, isopropyl, butyl, amyl, hexyl, octyl, dodecyl, hexadecyl, octadecyl, and the like; olefinic and acetylenic analogs of the foregoing, cyclohexyl, cyclopentyl, methylcyclohexyl, phenyl, naphthyl, methylnaphthyl, ethylnaphthyl, tolyl, xylyl, methoxyethyl, ethoxyethyl, methylpolyoxyethyl, methyloxypropyl, ethylpolyoxypropyl, and the like. It will be appreciated that if mixed esters are desired, a mixture of organic monohydroxy compounds can be employed in the esterification reaction.

When the esterification reaction is carried out in an anhydrous medium, the reaction product is a mixture of the desired ester as the aluminum halide complex and the free ester. The desired ester can be recovered from this mixture by treating with water to break the aluminum halide complex. When this is done the aluminum halide forms a hexahydrate which first appears as a precipitate and which dissolves as more water is added. The organic compound separates, generally, from the aqueous phase and may be readily recovered therefrom and worked up in conventional ways.

In an illustrative embodiment, ethyl dicresyl phosphonate is prepared by first reacting triethylaluminum with $PCl_5$ as described hereinbefore. The reaction product is then treated with about three mole proportions of anhydrous methyl alcohol, at room temperature, with agitation. The reaction mixture thus obtained is mixed with about six mole proportions of p-cresol, and refluxed for several hours. After cooling, the reaction mixture is treated with excess dilute aqueous caustic and the ethyl di-p-cresyl phosphonate organic phase separated and the solvent removed.

In the preparation of amide derivatives from the reaction mixture resulting from the reaction of aluminum trialkyl and $PCl_5$, the reaction mixture is treated with a chalcogen donor in the manner described hereinbefore to convert the same to the monoalkyl phosphonyl dichloride complex and free compound. Since the latter is only an intermediate, the conversion is effected in an anhydrous medium. The resulting reaction mixture is then treated with at least 6 mole proportions of an organic monoamine having the formula $R''_2NH$ and preferably an excess over the 6 mole proportions to accommodate the fact that the HCl formed is taken up by the free amine reactant thus rendering the amine unavailable for reaction with the chlorine group attached to the phosphorus atom. $R''_2NH$ is an organic monoamine of less than tertiary substitution wherein R'' is selected from the group consisting of aliphatic hydrocarbon, cycloaliphatic hydrocarbon, aromatic hydrocarbon, mixed aliphatic-aromatic hydrocarbon, divalent heterocyclic wherein N of the amine is included in the heterocyclic nucleus, and hydrogen, not more than one R'' being hydrogen. The hydrocarbon radicals may be saturated or unsaturated and substituted or unsubstituted, but when substituted the substituted group must be inert to the reaction between the amine and phosphonyl dichloride.

Specific illustrations of R'' are identical with those given for R' of the R'OH formula described hereinbefore with the exception of the alkyl oxyalkylene illustrations which are omitted. Specific examples of heterocyclic amines include morpholine, substituted morpholine, piperidine, substituted piperidine, pyrrolidine, and the like. Preferred amines are alkyl primary or secondary amines having from 1 to 18 carbon atoms, such as dimethyl amine, diethyl amine, hexyl amine, octyl amine, dodecyl amine, octadecyl amine, aniline, n-methylaniline and the like.

In an illustrative embodiment, ethyl bis-(N,N'-diethyl) phosphonamide is prepared by first reacting triethyl aluminum with $PCl_5$ as is described hereinbefore. The reaction product is then treated with about 3 mole proportions of anhydrous methyl alcohol, at room temperature with agitation, to convert the mixture to the complex and free ethylphosphonyl dichloride. The reaction mixture thus obtained is mixed with about 12 mole proportions of diethylamine and stirred for at least one hour. The reaction mixture is then filtered or treated with excess water and the ethyl bis (N,N'-diethyl) phosphonamide organic phase separated and the solvent removed.

With reference to the reaction mixture produced by the reaction between $POCl_3$ and aluminum alkyl (Equation II), as described hereinabove, monoalkyl phosphonate esters can be prepared therefrom by treating the reaction mixture as obtained with about six mole proportions of an organic monohydroxy compound having the formula R'OH which is identical with the R'OH described hereinbefore. It will be noted that in this case it is unnecessary to employ a chalcogen donor. If, however, it is desired to prepare the thio derivative, the reaction mixture can first be treated wtih a sulphur donating compound which will substitute for the oxygen present. Treatment with the R'OH results in the formation of a mixture containing an aluminum halide complex and free monoalkyl phosphonate ester. Treatment with water breaks the complex and the monoalkyl phosphonate ester can be readily recovered therefrom.

It will be appreciated that if the monoalkyl phosphonyl dichloride is the desired derivative to be obtained that this compound can be separated from the reaction mixture resulting from the reaction between the trialkylaluminum and the $POCl_3$. All that is required is that the aluminum chloride complex be broken by treatment with water, which may contain alkali.

In a similar manner, amide derivatives can be prepared from the reaction mixture resulting from the reaction of aluminum trialkyl and $POCl_3$. In this case, $R''_2NH$ is substituted for the R'OH and the reaction is carried out with an excess of $R''_2NH$ to accommodate the formation of HCl formed in the reaction.

In employing $POCl_3$ as a reactant with aluminum trialkyls it is the preferred practice to employ a purified $POCl_3$ in order to avoid undesirable side reactions and improve the reaction rate.

The following examples are intended to illustrate the underlying principles of the present invention and are not to be interpreted as unduly limiting thereof. The yields reported are based on the trialkyl aluminum employed.

*Example 1.—Di-p-Cresyl Ethylphosphonate*

Triethylaluminum, 11.6 g. (0.10 mole), dissolved in 80 ml. benzene, was added to phosphorous pentachloride, 62.5 g. (0.30 mole), in the presence of 175 ml. benzene, in one hour under nitrogen, allowing the temperature to gradually rise to 70° C. The reaction mixture was then heated at 70 to 80° C. for two hours. Methanol, 8.2 g. (0.255 mole), was added and the mixture heated at 40 to 45° C. for 30 minutes. Para-cresol, 82.6 g. (0.765 mole), dissolved in 100 ml. benzene, was added and the reaction mixture heated at reflux for ten hours. The cooled product was treated three times with cool water, and then washed twice with dilute sodium hydroxide to remove unreacted cresol. After washing with water until neutral, the solvent was removed under vacuum and then the product distilled. Di-p-cresyl ethylphosphonate, 21.5 g. (25%), was collected at 150–160° at 0.04 mm.

*Example 2.—Ethylphosphonyl Dichloride*

Triethylaluminum, 11.4 g. (0.10 mole), dissolved in 100 ml. benzene, was added to phosphorous oxychloride, 46.0 g. (0.30 mole), in 200 ml. benzene, in one hour at 35–45° C. under nitrogen. The reaction mixture was heated an additional 90 minutes at the same temperature. The clear, pale yellow solution was cooled in an ice bath and 17.4 ml. concentrated hydrochloric acid added at 0 to 5° C. After stirring at this temperature for another half hour, the liquid was decanted off and the solvent removed in vacuo. The residual product was distilled, and 5.4 g. (12%) of ethylphosphonyl dichloride was collected at 50–52° at 5 mm., $n_D^{26}$ 1.4637.

*Example 3.—Di-p-Cresyl Mixed Alkylphosphonates*

Mixed-alkyl trialkylaluminum of average molecular weight 391 (Continental Oil Company), 39.1 g. (0.10 mole), was dissolved in 80 ml. benzene and added to phosphorous oxychloride, 46.0 g. (0.30 mole), in 150 ml. benzene in 45 minutes at 35–40° C. under nitrogen. The reaction mixture was heated at 40 to 45° for another 4¼ hours. Para-cresol, 77.8 g. (0.72 mole), dissolved in 100 ml. benzene, was added and the mixture heated under reflux for eleven hours. The product was treated with 100 ml. portions at 15 to 25° C. three times and then washed with 100 ml. of 5% sodium hydroxide, followed by 100 ml. of 5% potassium hydroxide in 50% aqueous ethanol. After water-washing until neutral, the solvent was stripped off under vacuum. On standing, tri-p-cresylphosphate crystallized out. After filtration, there was left 38.9 g. (34%) of di-p-cresylalkylphosphonates, a clear pale yellow liquid.

*Example 4.—Di-p-Cresyl Mixed-Alkylphosphonates*

Mixed-alkyl trialkylaluminum of average molecular weight 391 (Continental Oil Company), 36.0 g. (0.09 mole), was dissolved in 75 ml. of benzene and added to phosphorous pentachloride, 57.5 g. (0.28 mole) in the presence of 150 ml. benzene in 45 minutes, under nitrogen, allowing the temperature to gradually rise to 65° C. The reaction mixture was heated at 70–80° C. for an additional two hours. Methanol, 7.5 g. (0.24 mole), was added and the mixture heated at 40 to 45° for a half hour. Para-cresol, 75.6 g. (0.70 mole), dissolved in 100 ml. benzene, was added and the flask contents were heated at reflux for ten hours. The reaction was washed and extracted as in the above examples. Removal of the solvent, followed by filtration of the tri-p-cresylphosphate which crystalized (3.7 g.), gave 69.6 g. (66%) of di-p-cresyl alkylphosphonates.

*Example 5.—Ethyl Bis-(N,N'-Diethyl)Phosphonamide*

Triethylaluminum, 0.10 mole, is dissolved in 100 ml. of benzene, and added to phosphorous oxychloride, 0.30 mole, in 150 ml. of benzene in one hour at 35–45° under a nitrogen blanket. The mixture is heated an additional one hour at the same temperature. The flask is surrounded with a cooling bath and diethylamine, 1.2 moles, in 150 ml. of benzene is added, keeping the temperature at 10 to 20°. Stirring is continued for another one hour at 15 to 25° and then the contents are treated with cold water. The organic layer is separated, washed with water a number of times, and then the solvent distilled. The residue is distilled, giving ethyl bis-(N,N'-diethyl) phosphonamide.

*Example 6.—Alkyl Bis-(N,N'-Methyl-N,N'-Phenyl) Phosphonamide*

This is carried out as Example 5 using mixed-alkyl trialkylaluminum of average molecular weight 390 (Continental Oil Company), 0.10 mole, and phosphorous pentachloride, 0.30 mole. The amine used is N-methylaniline, 1.2 moles. The resultant product is alkyl bis-(N,N'-methyl-N,N'-phenyl) phosphonamide.

While this invention has been described in terms of its preferred embodiments and modifications, it will be appreciated that changes can be made without departing from the spirit and scope of the invention.

We claim:

1. A method for the preparation of a monoalkyl phosphorus halide-aluminum halide complex which comprises reacting in an anhydrous medium in the absence of molecular oxygen one mole portion of a trialkyl aluminum having the formula $AlR_3$ with at least 3 mole proportions of a phosphorus halide selected from the group consisting of $PX_5$ and $POX_3$ wherein the above formula R is an alkyl radical having from 2 to 24 carbon atoms and X is a halide selected from the group consisting of iodine, bromine and chlorine.

2. A method for the preparation of a monalkyl phosphorus chloride-aluminum chloride complex which comprises reacting in an anhydrous medium in the absence of molecular oxygen one mole proportion of a trialkyl aluminum having the formula $AlR_3$ wherein R is an alkyl radical having from 2 to 24 carbon atoms, with at least 3 mole proportions of $PCl_5$.

3. A method for the preparation of a monoalkyl phosphorus chloride-aluminum chloride complex which comprises reacting in an anhydrous medium in the absence of molecular oxygen one mole proportion of a trialkyl aluminum having the formula $AlR_3$ wherein R is an alkyl radical having from 2 to 24 carbon atoms, with at least 3 mole proportions of $POCl_3$.

4. A method according to claim 2 wherein the trialkyl aluminum is triethylaluminum.

5. A method according to claim 2 wherein the trialkyl aluminum contains mixed alkyl groups varying from 2 to 24 carbon atoms.

6. A method according to claim 3 wherein the trialkyl aluminum is triethylaluminum.

7. A method according to claim 3 wherein the trialkyl aluminum contains mixed alkyl radicals varying from 2 to 24 carbon atoms.

8. A method for the preparation of organic monoalkyl phosphonic acid derivatives selected from the group consisting of monoalkyl phosphonic acid diesters and monoalkyl phosphonic acid diamides which comprises reacting in an anhydrous medium in the absence of molecular oxygen, one mole proportion of a trialkyl aluminum having the formula $AlR_3$ wherein R is an alkyl radical having from 2 to 24 carbon atoms with at least three mole proportions of $PX_5$ wherein X is a halogen selected from the group consisting of chlorine, bromine and iodine to form a reaction product comprising a mixture containing a complex of aluminum halide and monoalkyl phosphorus polyhalide and free monoalkyl phosphorus polyhalide; treating the thus obtained reaction mixture with a compound capable of acting as a chalcogen donor of a chalcogen selected from the group consisting of oxygen and sulfur to replace 2 atoms of halogen on said pentavalent phosphorus in said complex and free compound to convert said mixture to a corresponding mixture of monoalkyl phosphonyl halide-aluminum halide complex and free monoalkyl phosphonyl halide; reacting the thus obtained reaction mixture with at least six mole proportions of a compound selected from the group consisting of organic monohydroxy compounds having the formula R'OH and monoamines of less than tertiary substitution having the formula $R''_2NH$, wherein in said first formula R' is a radical selected from the group consisting of aliphatic hydrocarbon, cycloaliphatic hydrocarbon, aromatic hydrocarbon and alkyl oxyalkylene, and in said second formula R'' is a radical selected from the group consisting of aliphatic hydrocarbon, cycloaliphatic hydrocarbon, aromatic hydrocarbon, divalent heterocyclic wherein the N atom is part of the heterocyclic nucleus, and hydrogen, no more than one R'' being hydrogen, to form a reaction mixture containing corresponding aluminum halide-phosphonic acid derivative complex and corresponding free phosphonic acid derivative; treating the thus obtained reaction mixture with water to break the aluminum halide complex; and recovering monoalkyl phosphonic acid derivatives selected from the group consisting of corresponding monoalkyl phosphonic acid diesters and corresponding monoalkyl phosphonic acid diamides.

9. A method according to claim 8 wherein X is chlorine.

10. A method according to claim 8 wherein the chalcogen is oxygen.

11. A method for the preparation of a monoalkyl phosphonic acid diester which comprises reacting in an anhydrous medium in the absence of molecular oxygen one mole proportion of a trialkyl aluminum having the formula $AlR_3$ wherein R is an alkyl radical having from 2 to 24 carbon atoms with at least three mole proportions of $PCl_5$ to form a reaction mixture containing an aluminum chloride-monoalkyl phosphorus polyhalide complex and free monoalkyl phosphorus polyhalide; treating the thus-obtained reaction mixtures with about three mole proportions of a lower alkyl monohydric alcohol to obtain a corresponding mixture of aluminum chloride-monoalkyl phosphonyl dichloride complex and free monoalkyl phosphonyl dichloride; reacting the thus obtained reaction mixture with at least six mole proportions of an organic monohydroxy compound having the formula R'OH wherein R' is selected from the group consisting of aliphatic hydrocarbon, aromatic hydrocarbon, cycloaliphatic hydrocarbon, and alkyl oxyalkylene to produce a reaction mixture containing the corresponding aluminum chloride-monoalkyl phosphonic acid diester complex and corresponding free monoalkyl phosphonic acid diester; treating the thus-obtained reaction mixture with water to break the aluminum chloride complex; and recovering the corresponding monoalkyl phosphonic acid diester therefrom.

12. A method according to claim 11 wherein the lower alkyl alcohol is methyl alcohol and R'OH is a cresol.

13. A method according to claim 11 wherein the lower alkyl alcohol is isopropyl alcohol.

14. A method according to claim 11 wherein R'OH is octyl alcohol.

15. A method for the preparation of a monoalkyl phosphonic acid diamide which comprises reacting in an anhydrous medium in the absence of molecular oxygen one mole proportion of a trialkyl aluminum having the formula $AlR_3$ wherein R is an alkyl radical having from two to twenty-four carbon atoms with at least three mole proportions of $PCl_5$ to form a reaction mixture containing an aluminum chloride-monoalkyl phosphorus polyhalide complex and free monoalkyl phosphorus polyhalide; treating the thus obtained reaction mixture with about three mole proportions of a lower alkyl monohydric alcohol to produce a reaction mixture containing a corresponding mixture of aluminum dichloride monoalkyl phosphonyl dichloride complex and free monoalkyl phosphonyl dichloride; treating the thus obtained reaction mixture with at least six mole proportions of a monoamine having the formula $R'_2NH$ wherein R' is selected from the group consisting of aliphatic hydrocarbon, cycloaliphatic hydrocarbon, aromatic hydrocarbon, hydrogen and divalent heterocyclic wherein the N of the monoamine is included in the heterocyclic nucleus, there being not more than one hydrogen, to obtain a mixture of corresponding aluminum chloride-monoalkyl phosphonic acid diamide complex and corresponding free monoalkyl phosphonic acid diamide, treating the thus-obtained reaction mixture with water to break the aluminum chloride complex; and recovering the corresponding monoalkyl phosphonic acid diamide therefrom.

16. A method according to claim 15 wherein the lower alkyl monohydric alcohol is methanol.

17. A method according to claim 15 wherein the lower monohydric alkyl alcohol is isopropyl alcohol.

18. A method according to claim 15 wherein $R'_2NH$ is a lower alkyl secondary amine.

19. A method according to claim 18 wherein the amine is diethyl amine.

20. A method for the preparation of monoalkyl phosphonic acid derivatives selected from the group consisting of monoalkyl phosphonic acid diesters and monoalkyl phosphonic acid diamides which comprises reacting in an anhydrous medium in the absence of molecular oxygen one mole proportion of a trialkyl aluminum having the formula $AlR_3$ wherein R is an alkyl radical having from two to twenty-four carbon atoms with at least three mole proportions of $POX_3$ wherein X is a halogen selected from the group consisting of chlorine, bromine and iodine to produce a reaction mixture containing aluminum halide-monoalkyl phosphonyl halide complex and free monoalkyl phosphonyl halide; reacting the thus obtained reaction mixture with at least six mole proportions of a compound selected from the group consisting of organic monohydroxy compounds and monoamines of less than tertiary substitution having the formula $R''_2NH$, wherein in said first formula R' is a radical selected from the group consisting of aliphatic hydrocarbon, cycloaliphatic hydrocarbon, aromatic hydrocarbon and alkyl oxyalkylene, and in said second formula R'' is a radical selected from the group consisting of aliphatic hydrocarbon, cycloaliphatic hydrocarbon, aromatic hydrocarbon, divalent heterocyclic wherein the N atom is part of the heterocyclic nucleus, and hydrogen, no more than one R'' being hydrogen to obtain a mixture of corresponding aluminum halide-monoalkyl phosphonic acid derivative complex and corresponding free monoalkyl phosphonic acid derivative; treating the thus-obtained reaction mixture with water to break the aluminum halide complex; and recovering a monoalkyl phosphonic acid derivative selected from the group consisting of corresponding monoalkyl phosphonic acid diesters and corresponding monoalkyl phosphonic acid diamides therefrom.

21. A method according to claim 20 wherein X is chlorine.

22. A method for the preparation of a monoalkyl phosphonic acid diester which comprises reacting in an anhydrous medium in the absence of molecular oxygen one mole proportion of a trialkyl aluminum having the formula $AlR_3$ wherein R is an alkyl radical having from two to twenty-four carbon atoms with at least three mole proportions of $POCl_3$ to form a reaction mixture containing aluminum chloride-monoalkyl phosphonyl dichloride complex and free monoalkyl phosphonyl dichloride; reacting the thus obtained reaction mixture with at least six mole proportions of an organic monohydroxy compound having the formula R'OH wherein R' is selected from the group consisting of aliphatic hydrocarbon, aromatic hydrocarbon, cycloaliphatic hydrocarbon, mixed aliphatic aromatic hydrocarbon, and alkyl oxyalkylene to obtain a reaction mixture containing corresponding aluminum chloride-monoalkyl phosphonic acid diester complex and corresponding free monoalkyl phosphonic acid diester; treating the thus obtained reaction mixture with water to break the aluminum chloride complex and recovering the corresponding monoalkyl phosphonic acid diester therefrom.

23. A method according to claim 22 wherein R'OH is a cresol.

24. A method according to claim 22 wherein R'OH is octyl alcohol.

25. A method for the preparation of a monoalkyl phosphonic acid diamide which comprises reacting in an anhydrous medium in the absence of molecular oxygen one mole proportion of a trialkyl aluminum having the formula $AlR_3$ wherein R is an alkyl radical having from two to twenty-four carbon atoms with at least three mole proportions of $POCl_3$ to form a reaction product mixture containing aluminum chloride-monoalkyl phosphonyl dichloride complex and free monoalkyl phosphonyl dichloride; treating the thus obtained reaction mixture with at least six mole proportions of an organic monoamine having the formula $R''_2NH$ wherein R'' is selected from the group consisting of aliphatic hydrocarbon, aromatic hydrocarbon, cycloaliphatic hydrocarbon, hydrogen and divalent heterocyclic wherein N of the amine is included in the heterocyclic nucleus, no more than one R'' being hydrogen, to form a new reaction mixture comprising the corresponding mixture of aluminum chloride-monoalkyl phosphonic acid diamide complex and free monoalkyl phosphonic acid diamide; treating the reaction mixture with water to break the aluminum chloride complex; and recovering the corresponding monoalkyl phosphonic acid diamide therefrom.

26. A method according to claim 25 wherein the trialkyl aluminum is triethylaluminum.

27. A method according to claim 25 wherein $R''_2NH$ is a lower alkyl secondary amine.

28. A method according to claim 27 wherein the amine is diethyl amine.

References Cited in the file of this patent

UNITED STATES PATENTS 2,137,792 Woodstock ------------ Nov. 22, 1938